(12) United States Patent
Ali et al.

(10) Patent No.: US 7,941,638 B2
(45) Date of Patent: May 10, 2011

(54) FACILITATING FAST SCANNING FOR CONTROL TRANSFER INSTRUCTIONS IN AN INSTRUCTION FETCH UNIT

(75) Inventors: Abid Ali, San Jose, CA (US); Andrew T. Ewoldt, San Jose, CA (US)

(73) Assignee: Oracle America, Inc., Redwood Shores, CA (US)

(*) Notice: Subject to any disclaimer, the term of this patent is extended or adjusted under 35 U.S.C. 154(b) by 432 days.

(21) Appl. No.: 11/454,393

(22) Filed: Jun. 15, 2006

(65) Prior Publication Data

US 2007/0294513 A1    Dec. 20, 2007

(51) Int. Cl.
*G06F 9/26* (2006.01)
(52) U.S. Cl. ....................................... 712/207
(58) Field of Classification Search ............... 712/207
See application file for complete search history.

(56) References Cited

U.S. PATENT DOCUMENTS

| | | | |
|---|---|---|---|
| 2005/0033941 A1* | 2/2005 | Joyce et al. | 712/213 |
| 2005/0198466 A1* | 9/2005 | Estlick et al. | 711/207 |
| 2006/0242365 A1* | 10/2006 | Ali et al. | 711/137 |

OTHER PUBLICATIONS

Shen, John Paul, Lipasti, Mikko. "Modern Processor Design: Fundamentals of Superscalar Processors". McGraw-Hill, 2005. pp. 230-231.*
Dictionary.com: "subset" definition. 2009.*

* cited by examiner

*Primary Examiner* — Robert Fennema
(74) *Attorney, Agent, or Firm* — Park, Vaughan, Fleming & Dowler LLP

(57) ABSTRACT

One embodiment of the present invention provides a system that performs a fast-scanning operation to generate fetch bundles within an instruction fetch unit (IFU) of a processor. During operation, the system obtains a cache line containing instructions at the IFU. Next, the system performs a complete-scanning operation on the cache line to identify control transfer instructions (CTIs) in the cache line. At the same time, the system performs a fast-scanning operation to identify CTIs in a group of initial instructions in the cache line, wherein the initial instructions are executed before other instructions in the cache line. Next, the system obtains results from the fast-scanning operation before results of the complete-scanning operation are available. The system then uses results from the fast-scanning operation to form an initial fetch bundle containing initial instructions, and sends the initial fetch bundle to the instruction-issue unit.

21 Claims, 3 Drawing Sheets

FACILITATING FAST SCANNING FOR CONTROL TRANSFER INSTRUCTIONS IN AN INSTRUCTION FETCH UNIT

BACKGROUND

1. Field of the Invention

The present invention relates generally to the design of processors within computing systems. More specifically, the present invention relates to a method and an apparatus that provides a fast-scanning operation for control-transfer instructions (CTIs) to speed up the process of forming of fetch bundles within an instruction fetch unit (IFU) of a processor.

2. Related Art

Advances in semiconductor fabrication technology have given rise to dramatic increases in processor clock speeds. These increasing clock speeds have significantly increased processor performance. However, as clocks speeds continue to increase, the time available to perform computational operations during each pipeline stage decreases. This makes it harder to complete many types of computational operations within a single pipeline stage.

For example, as clock speeds continue to increase, it is becoming progressively harder to perform CTI-scanning operations within an instruction-fetch unit (IFU) within a single clock cycle. In high-performance processors, the IFU typically sends multiple instructions to the instruction-issue unit (IIU) at the same time. In order to do so, the IFU first needs to determine which instructions should be sent to the IFU. This determination typically involves performing a CTI-scanning operation on a cache line containing the instructions to identify CTIs, such as branches, which can cause the execution flow to jump to another location. As clock speeds continue to increase, it is becoming harder to perform a CTI-scanning operation on an entire cache line within a single cycle. This problem can be solved by using two pipeline stages to perform the CTI-scanning operation. However, using a second pipeline stage for the CTI-scanning operation can reduce overall processor performance.

Hence, what is needed is a method and an apparatus for performing a CTI-scanning operation to generate instruction fetch bundles without using an additional pipeline stage.

SUMMARY

One embodiment of the present invention provides a system that performs a fast-scanning operation to generate fetch bundles within an instruction fetch unit (IFU) of a processor. During operation, the system obtains a cache line containing instructions at the IFU. Next, the system performs a complete-scanning operation on the cache line to identify control transfer instructions (CTIs) in the cache line. At the same time, the system performs a fast-scanning operation to identify CTIs in a group of initial instructions in the cache line, wherein the initial instructions are executed before other instructions in the cache line. Next, the system obtains results from the fast-scanning operation before results of the complete-scanning operation are available. The system then uses results from the fast-scanning operation to form an initial fetch bundle containing initial instructions, and sends the initial fetch bundle to the instruction-issue unit.

In a variation on this embodiment, when results from the complete-scanning operation become available, the system uses the results from the complete-scanning operation to form other fetch bundles containing other instructions from the cache line, and sends the other fetch bundles to the instruction-issue unit.

In a variation on this embodiment, while performing the fast-scanning operation, the system first uses the program counter to identify the group of initial instructions. Next, the system locates CTIs in the group of initial instructions, and determines which initial instructions are valid based on locations of the CTIs in the group of initial instructions. Finally, the system generates corresponding valid signals for the initial instructions.

In a further variation, while performing the fast-scanning operation, if the program counter indicates that the group of initial instructions is located at the end of the cache line, the system generates a fast end-of-line (EOL) signal, which allows another cache line fetch to be launched.

In a further variation, while determining which initial instructions are valid, the system predicts conditional-branch instructions to be taken.

In a variation on this embodiment, while determining which initial instructions are valid, the system determines that a small-forward branch instruction is valid, but a following delay slot is not valid. This causes the following delay slot to be included in a following fetch bundle, which allows additional time for the branch target to be computed.

In a variation on this embodiment, while forming the initial fetch bundle, the system first determines which initial instructions are valid by examining valid signals produced by the fast-scanning operation, and then forms the initial fetch bundle from the valid initial instructions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Processor

Figure 1:
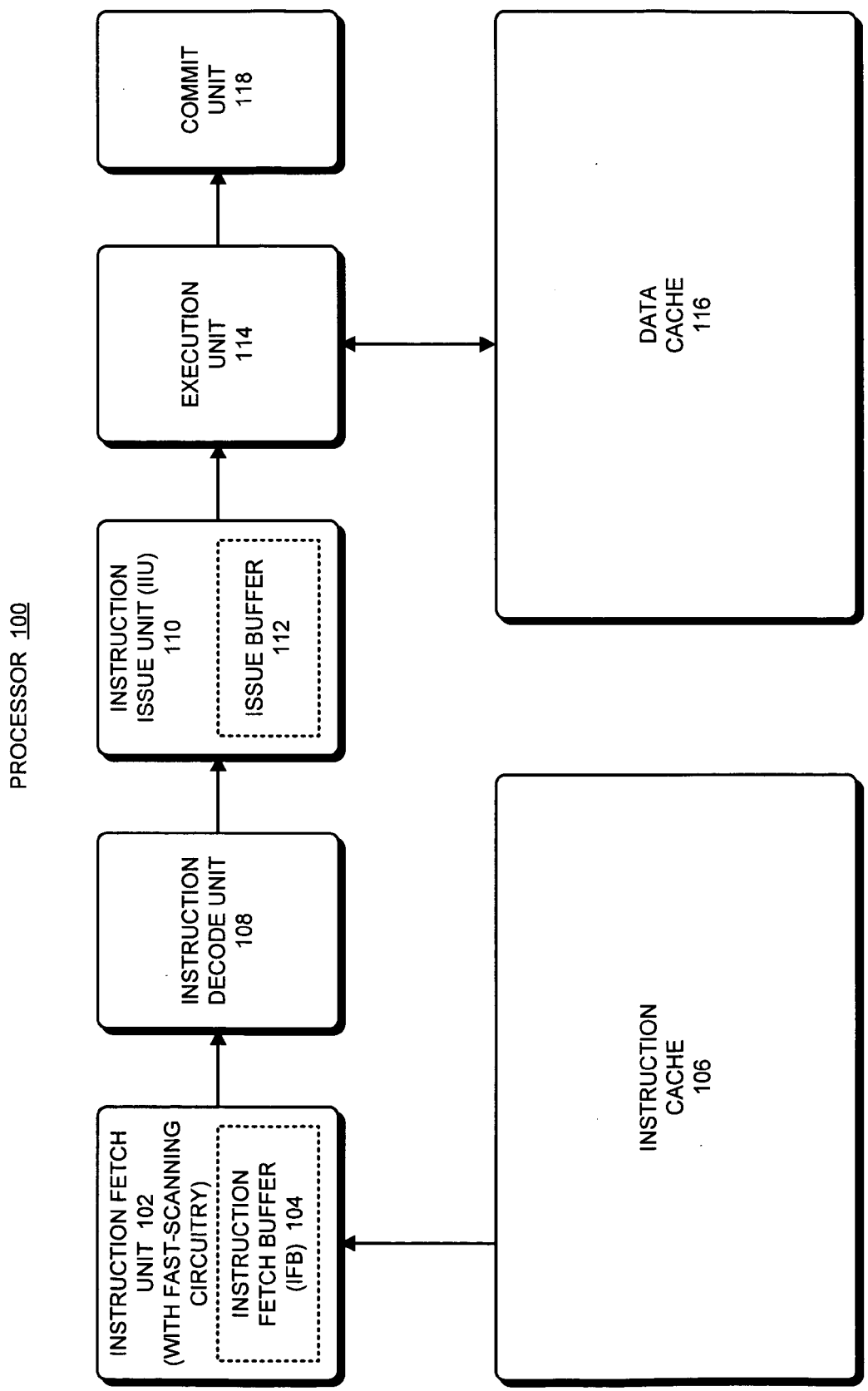
FIG. 1 presents a block diagram of a processor in accordance with an embodiment of the present invention.

FIG. 1 presents a block diagram of a processor 100 in accordance with an embodiment of the present invention. Processor 100 can generally include any type of processor, including, but not limited to, a microprocessor, a mainframe computer, a digital signal processor, a device controller and a computational engine within an appliance.

Referring to FIG. 1, processor 100 includes instruction-fetch unit (IFU) 102, which fetches cache lines containing instructions from instruction cache 106. IFU 102 temporarily stores these cache lines in instruction-fetch buffer (IFB) 104, and forwards "bundles" of instructions downstream to instruction-decode unit 108. Instruction-decode unit 108 decodes and forwards the instructions to instruction-issue unit 110, which stores the instructions in issue buffer 112. Next, IIU 110 sends the instructions to execution unit 114. During execution of the instructions, execution unit 118 can access data from data cache 116. When the instructions have finished executing, the results are sent to commit unit 118, which commits the results.

In one embodiment of the present invention, IFU 102 contains fast-scanning circuitry which identifies CTIs in a group of initially-executed instructions in a cache line to facilitate quickly forming an initial fetch bundle for the cache line. This process is described in more detail below with reference to FIGS. 2-3.

Pipeline-Stage Diagram

Figure 2:
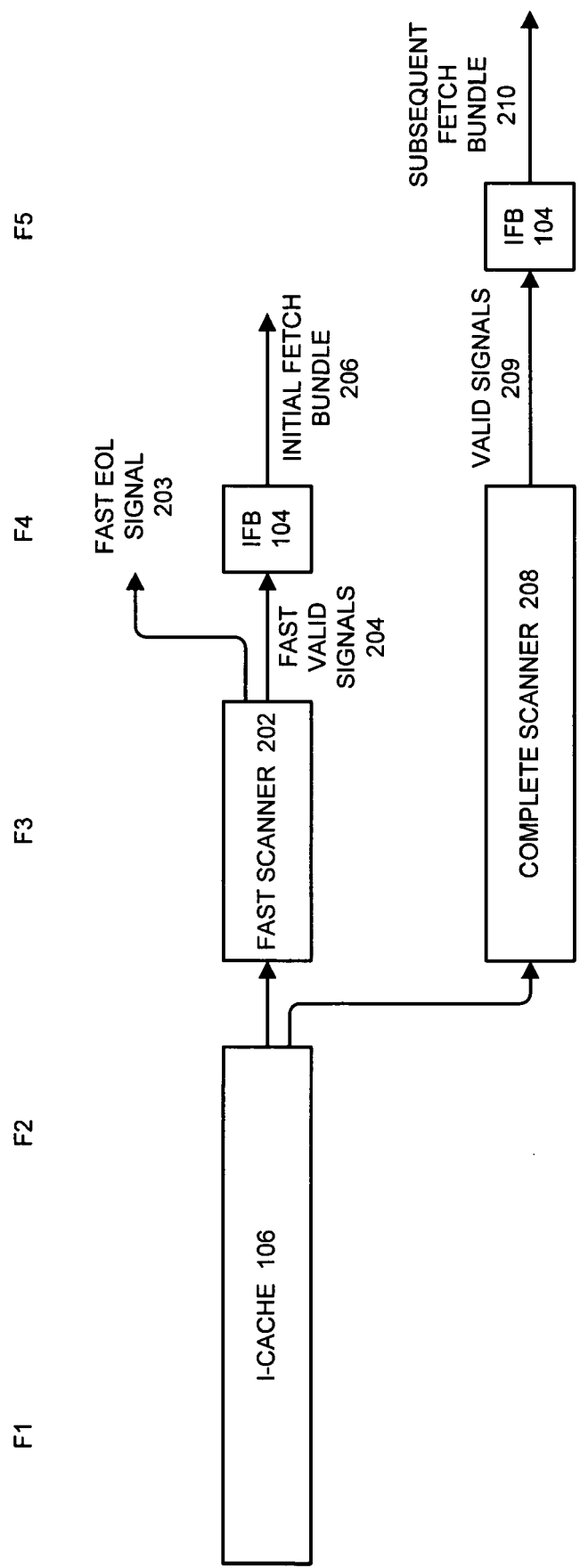
FIG. 2 presents a pipeline-stage diagram illustrating CTI-scanning operations in accordance with an embodiment of the present invention.

FIG. 2 presents a pipeline-stage diagram illustrating CTI-scanning operations in accordance with an embodiment of the present invention. More specifically, FIG. 2 illustrates various operations that take place during five pipeline states F1-F5, which are associated with the instruction-fetching process.

During stages F1 and F2 a cache line is retrieved from instruction cache 106 into IFB 104. Next, in stage F3 complete-scanner 208 scans the entire cache line to locate CTI instructions. At the same time, fast scanner 202 scans a smaller group of instructions from the cache line which will be executed first. Fast scanner 202 subsequently produces fast-valid signals 204 and also a fast end-of-line (EOL) signal 203 at the start of stage F4. (Fast EOL signal 203 will be discussed in more detail below with reference to FIG. 3.)

At stage F3, the fast-valid signals 204 feed into IFB 104, which are then flopped to stage F4. These stage F4 fast-valid signals are used to create an initial fetch bundle 206, and this initial fetch bundle 206 is sent to IIU 110 (through instruction-decode unit 108).

Note that the locations of the CTI instructions indicate where branches can potentially take place, and these branches determine whether instructions should be included in a fetch bundle. For example, an instruction following a taken-branch should not be included in the same fetch bundle as the taken-branch, because the execution stream will jump to the branch target and the instruction following the taken-branch will not be executed (at least not right away).

In contrast to fast scanner 202, complete-scanner 208 produces valid signals 209 for the entire cache line at the start of stage F4 which get flopped by the IFB block. These stage F5 valid signals are then used to create one or more subsequent fetch bundles 210 for the cache line as necessary.

Note that fast-scanner 202 produces valid signals one cycle earlier that complete-scanner 208. This enables the initial fetch bundle 206 be sent to IIU 110 one cycle earlier than would be possible if only complete-scanner 208 were used.

Forming Fetch Bundles

Figure 3:
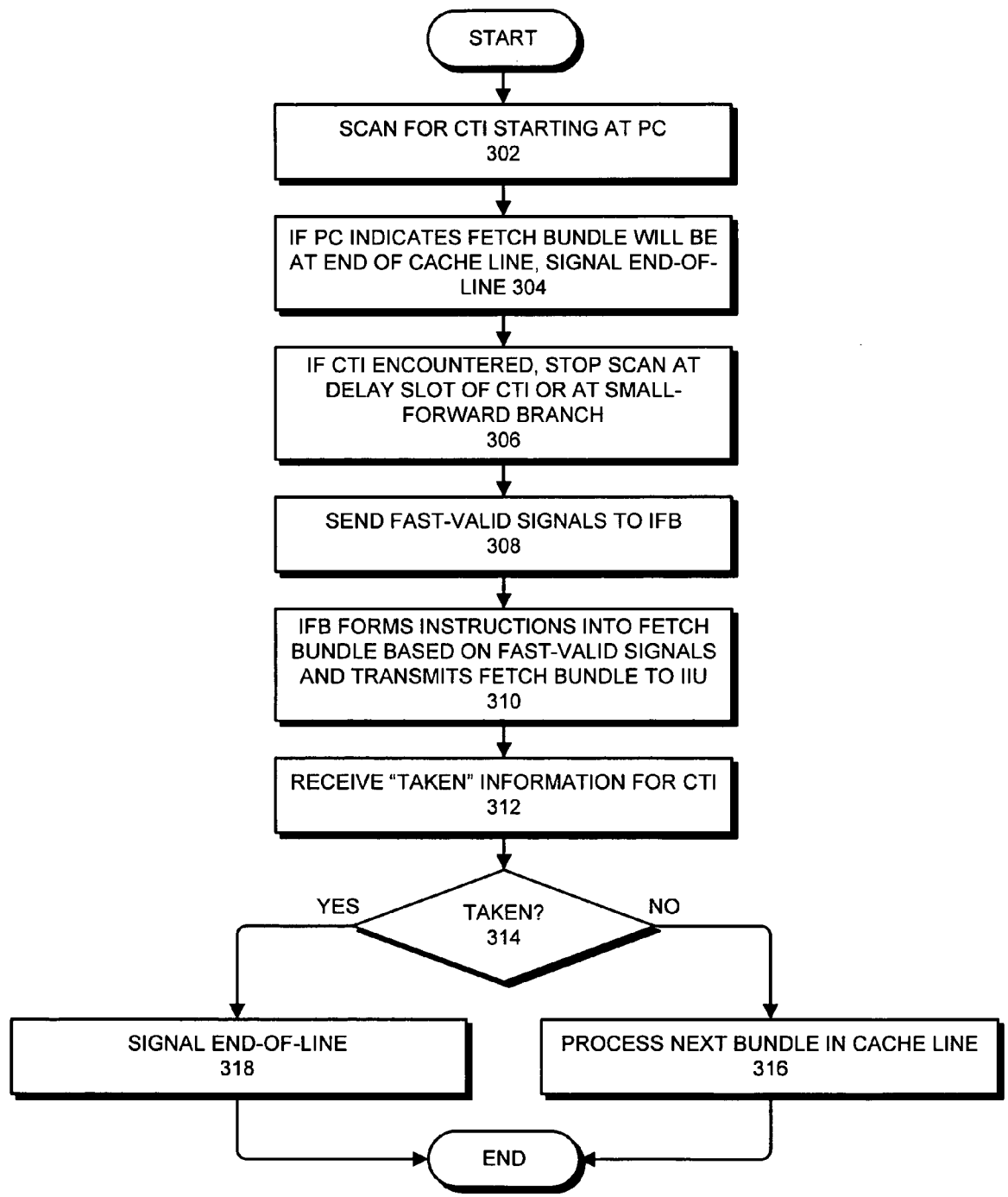
FIG. 3 presents a flow chart illustrating how a fast scanner is used to form an initial fetch bundle for a cache line in accordance with an embodiment of the present invention.

FIG. 3 presents a flow chart illustrating how fast scanner 202 is used to form initial fetch bundle 206 in accordance with an embodiment of the present invention. First, the system scans a group of initial instructions in the cache line starting at the program counter (step 302). For example, if the cache contains 16 instructions and a fetch bundle can contain up to four instructions, the system can scan the first four instructions starting from the program counter (PC).

If the PC indicates that the current fetch bundle is the last fetch bundle in the cache line, the system generates a fast EOL signal 203 (step 304). More specifically, if the PC happens to fall in vector locations C, D, E or F and the fast-valid bundle formation (maximum up to 4) encompasses all of the remaining vector locations, then end-of-line can be signaled. This fast EOL signal 203 can be used to speed up the process of restoring a fetch buffer credit, which enables a fetch for the next cache line to be launched earlier.

During the fast-scanning operation, branches are assumed to be taken. Hence, if a CTI is encountered during the fast-scanning operation, the system stops the scan at the delay slot following the CTI.

In a special case, if the CTI is a "small-forward branch," which branches to a following address in the same cache line, the fast scanning stops at the small-forward branch and does not proceed to the following delay slot (step 306). Hence, a small-forward branch instruction is determined to be valid, but the following delay slot is determined to be not valid, which causes the following delay slot to be included in a following fetch bundle. This allows additional time for the branch target to be computed.

When the scanning process is complete, the system generates fast-valid signals 204 which are sent to IFB 104 (step 308). For example, if instructions bundles contain up to four instructions, there are five possible patterns of valid signals, 0000, 0001, 0011, 0111, and 1111.

IFB 104 forms the instructions into an initial fetch bundle 206 based on fast-valid signals 204 and transmits initial fetch bundle 206 to IIU 110 (step 310).

At this point, if a CTI was encountered during the scanning process, the system receives information indicating whether or not the CTI was a branch that was taken (step 312). If the CTI is a branch that was not taken, the system processes the next bundle in the cache line (step 316). Otherwise, the system generates an EOL signal (step 318).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a fast-scanning operation to generate fetch bundles in an instruction fetch unit (IFU) of a processor, comprising:
    obtaining a cache line containing instructions at the IFU;
    performing a complete-scanning operation on the cache line in a complete-scanning circuit to identify control transfer instructions (CTIs) by scanning a first set of instructions in the cache line;
    at the same time that the complete-scanning operation is performed, separately performing the fast-scanning operation in a fast-scanning circuit to identify CTIs in a group of initial instructions in the cache line by scanning a second set of instructions in the cache line, wherein the second set of instructions is a subset of the first set of instructions that consists of a smaller number of instructions than the first set of instructions;
    obtaining results from the fast-scanning operation before results of the complete-scanning operation are available;
    using the results from the fast-scanning operation to form an initial fetch bundle containing initial instructions; and
    sending the initial fetch bundle to an instruction-issue unit.

2. The method of claim 1, wherein when results from the complete-scanning operation become available, the method further involves:

using the results from the complete-scanning operation to form other fetch bundles containing other instructions from the cache line; and sending the other fetch bundles to the instruction-issue unit.

3. The method of claim 1, wherein performing the fast-scanning operation involves:

using a program counter to identify the group of initial instructions;

determining locations of CTIs in the group of initial instructions;

determining which initial instructions are valid based on the locations of the CTIs in the group of initial instructions; and generating corresponding valid signals for the group of initial instructions.

4. The method of claim 3, wherein while performing the fast-scanning operation, if the program counter indicates that the group of initial instructions is located at the end of the cache line, the method further comprises generating a fast end-of-line (EOL) signal, which allows another cache line fetch to be launched.

5. The method of claim 3, wherein while determining which initial instructions in the group of initial instructions are valid, conditional-branch instructions are predicted to be taken.

6. The method of claim 5, wherein while determining which initial instructions are valid, a small-forward branch instruction is determined to be valid, but a following delay slot is determined to be not valid, which causes the following delay slot to be included in a following fetch bundle, thereby allowing additional time for a branch target to be computed.

7. The method of claim 1, wherein using the results from the fast-scanning operation to form the initial fetch bundle involves:

determining which initial instructions in the group of initial instructions are valid by examining one or more valid signals produced by the fast-scanning operation; and forming the initial fetch bundle from the valid initial instructions.

8. An apparatus that performs a fast-scanning operation to generate fetch bundles in an instruction fetch unit (IFU) of a processor, comprising:

a receiving mechanism configured to receive a cache line containing instructions;

a complete-scanning circuit configured to perform a complete-scanning operation on the cache line to identify control transfer instructions (CTIs) by scanning a first set of instructions in the cache line;

a fast-scanning circuit that operates in parallel with and separately from the complete-scanning circuit, wherein the fast-scanning circuit is configured to perform the fast-scanning operation to identify CTIs in a group of initial instructions in the cache line by scanning a second set of instructions in the cache line, wherein the second set of instructions is a subset of the first set of instructions that consists of a smaller number of instructions than the first set of instructions;

a bundle-forming mechanism, which is configured to, obtain results from the fast-scanning operation before results of the complete-scanning operation are available, use the results from the fast-scanning operation to form an initial fetch bundle containing initial instructions, and to send the initial fetch bundle to an instruction-issue unit.

9. The apparatus of claim 8, wherein when results from the complete-scanning circuit become available, the bundle-forming mechanism is configured to:

use the results from the complete-scanning circuit to form other fetch bundles containing other instructions from the cache line; and to send the other fetch bundles to the instruction-issue unit.

10. The apparatus of claim 8, wherein the fast-scanning circuit is configured to:

use the program counter to identify the group of initial instructions;

locate CTIs in the group of initial instructions;

determine which initial instructions are valid based on locations of the CTIs in the group of initial instructions; and to generate corresponding valid signals for the group of initial instructions.

11. The apparatus of claim 10, wherein while performing the fast-scanning operation, if the program counter indicates that the group of initial instructions is located at the end of the cache line, the fast-scanning circuit is configured to generate a fast end-of-line (EOL) signal, which allows another cache line fetch to be launched.

12. The apparatus of claim 10, wherein while determining which initial instructions in the group of initial instructions are valid, the fast-scanning circuit predicts conditional-branch instructions to be taken.

13. The apparatus of claim 12, wherein while determining which initial instructions are valid, a small-forward branch instruction is determined to be valid, but the following delay slot is determined to be not valid, which causes the following delay slot to be included in a following fetch bundle, thereby allowing additional time for a branch target to be computed.

14. The apparatus of claim 8, wherein while using the results from the fast-scanning operation to form the initial fetch bundle, the bundle-forming mechanism is configured to:

determine which initial instructions in the group of initial instructions are valid by examining one or more valid signals produced by the fast-scanning circuit; and to form the initial fetch bundle from the valid initial instructions.

15. A computer system performs a fast-scanning operation to generate fetch bundles in an instruction fetch unit (IFU) of a processor, comprising:

a processor;

a memory;

an IFU within the processor;

a receiving mechanism within the IFU, which is configured to receive a cache line containing instructions;

a complete-scanning circuit within the IFU, which is configured to perform a complete-scanning operation on the cache line to identify control transfer instructions (CTIs) by scanning a first set of instructions in the cache line;

a fast-scanning circuit within the IFU that operates in parallel with and separately from the complete-scanning circuit, wherein the fast-scanning circuit is configured to perform the fast-scanning operation to identify CTIs in a group of initial instructions in the cache line by scanning a second set of instructions in the cache line, wherein the second set of instructions is a subset of the first set of instructions that consists of a smaller number of instructions than the first set of instructions;

a bundle-forming mechanism within the IFU, which is configured to, obtain results from the fast-scanning operation before results of the complete-scanning operation are available, use the results from the fast-scanning operation to form an initial fetch bundle containing initial instructions, and to send the initial fetch bundle to an instruction-issue unit.

16. The computer system of claim 15, wherein when results from the complete-scanning circuit become available, the bundle-forming mechanism is configured to:

use the results from the complete-scanning circuit to form other fetch bundles containing other instructions from the cache line; and to send the other fetch bundles to the instruction-issue unit.

17. The computer system of claim 15, wherein the fast-scanning circuit is configured to:

use the program counter to identify the group of initial instructions;

locate CTIs in the group of initial instructions;

determine which initial instructions are valid based on locations of the CTIs in the group of initial instructions; and to generate corresponding valid signals for the group of initial instructions.

18. The computer system of claim 17, wherein while performing the fast-scanning operation, if the program counter indicates that the group of initial instructions is located at the end of the cache line, the fast-scanning circuit is configured to generate a fast end-of-line (EOL) signal, which allows another cache line fetch to be launched.

19. The computer system of claim 17, wherein while determining which initial instructions in the group of initial instructions are valid, the fast-scanning circuit predicts conditional-branch instructions to be taken.

20. The computer system of claim 19, wherein while determining which initial instructions are valid, a small-forward branch instruction is determined to be valid, but the following delay slot is determined to be not valid, which causes the following delay slot to be included in a following fetch bundle, thereby allowing additional time for a branch target to be computed.

21. The computer system of claim 15, wherein while using the results from the fast-scanning operation to form the initial fetch bundle, the bundle-forming mechanism is configured to:

determine which initial instructions in the group of initial instructions are valid by examining one or more valid signals produced by the fast-scanning circuit; and to form the initial fetch bundle from the valid initial instructions.

* * * * *